United States Patent Office 3,551,520
Patented Dec. 29, 1970

3,551,520
UNSATURATED POLYESTERS HAVING IMPROVED PROPERTIES FROM CYCLOHEXANE DIMETHANOL CARBONATES
Rudolf Nehring and Klaus Heidel, Marl, and Karl Hamann, Leonberg, Germany, assignors to Chemische Werke Hüls A.G., Marl, Germany
No Drawing. Filed May 23, 1967, Ser. No. 640,506
Claims priority, application Germany, June 4, 1966,
C 39,268
Int. Cl. C08f *21/02*
U.S. Cl. 260—861                                    7 Claims

ABSTRACT OF THE DISCLOSURE

Unsaturated polyesters of unsaturated polybasic acids or anhydrides and dihydric alcohols of the formula:

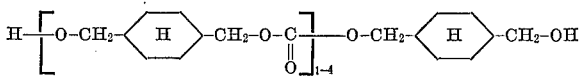

such esters after cross-linking being alkali-resistant and exhibiting a combination of high impact strength and excellent heat distortion stability.

---

Applicants hereby claim the benefit of the filing date of German patent application C 39,268, filed June 4, 1966.

This invention relates to unsaturated polyesters and, in particular, to the production of impact-resistant polymers being dimensionally stable at high temperatures.

BACKGROUND OF THE INVENTION

Conventional unsaturated polyesters are customarily cross-linked by monomeric vinyl allyl, or acrylic compounds. It is also usual to employ peroxides or other free radical-formers as catalysts, as well as heavy metal or amine compounds as accelerators. In admixture with fillers, coloring agents, or fibrous reinforcing materials, such polyesters are formed and cured into molded parts, laminates, or coatings.

Such unsaturated polyesters are typically formed from (a) α,β-unsaturated dicarboxylic acids, such as, for example, fumaric or maleic acid, (b) polyhydric alcohols, such as ethylene glycol, diethylene glycol, 1,2-propanediol, or 1,3-butanediol, and (c) saturated dicarboxylic acids, such as phthalic acid or adipic acid. Final products based on such polyesters, while having a certain field of application, generally exhibit only limited resistance against strong alkalis, and the surfaces of the products exposed to air remain more or less soft and tacky. Furthermore, the lack of combined impact strength and heat distortion stability at high temperatures eliminates polyesters from consideration in many areas.

In this connection, whereas it is known that by increasing the content of α,β-unsaturated dicarboxylic acids in the unsaturated polyester resins, the heat distortion stability at elevated temperatures and the alkali resistance of the cured products can be increased, this can only be accomplished at the sacrifice of simultaneously incurring an increase in the brittleness and a decrease in impact strength.

Another known technique for the improvement of the properties of products based on unsaturated polyesters is to employ polyvalent alcohols containing mono- or poly-nuclear aromatic or cycloaliphatic residues, for example: bis-(hydroxycyclohexyl) alkanes obtainable by nuclear hydrogenation of the corresponding bisphenols; cyclohexane-1,4-dimethanol; cyclohexanediols; ethoxylated bisphenols; endomethylene-tetrahydrophthalyl alcohol; and tricyclodecane dimethanol. The inclusion of such diols in the esterification process improves the dimensional high temperature stability and the surface hardness of the cured polyester resins. However, with respect to the surface hardness, though air-drying of the product yields a hard and dry lacquer on the film surface, the interior of the product is not completely hardened. Furthermore, due to insufficient elasticity and impact strength, films and molded parts tend to form cracks, particularly when using polyesters having high melting points and hardness values. A further disadvantage of polyester resins produced by the esterification of, for example, hydrogenated bisphenol A, cyclohexane-1,4-dimethanol, or 1,4-cyclohexanediol with fumaric acid residues in that they crystallize out of their solutions in vinyl monomers, therefore requiring the use of higher temperatures for the processing thereof.

An object of this invention, therefore, is to provide improved unsaturated polyesters, and products resulting therefrom.

Another object is to provide a process for producing such polyesters.

A further object is to provide alkali-resistant products having a combination of high impact strengths and high heat distortion points.

Upon further study of the specification and claims, other objects and advantages of the present invention will become apparent.

For the attainment of the above objects, there are provided unsaturated polyesters of unsaturated polybasic acids (or equivalent esterifiable anhydrides and the like, the term "acid" hereinafter including all such equivalents) and as the essence of this invention one or more carbonates of cyclohexane-1,4-dimethanol of the Formula A:

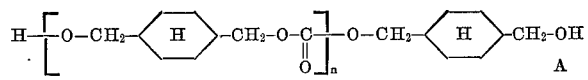

$n$ being an integer from 1 to 9, preferably 1 to 4.

Such dihydric carbonate compounds can easily be produced according to German patent application C 38,191 of Feb. 11, 1966, corresponding to U.S. patent application No. 610,230 by causing 1,4-bis-(hydroxymethyl)-cyclohexane and phosgene in a molar ratio within the range from 1:0.5 to 1:0.97 to react at atmospheric pressure in the presence of an inert solvent.

1,4-bis-(hydroxymethyl)-cyclohexane can be employed in its trans- or cis-form or as a mixture thereof.

Inert solvents to be used are preferably substances with boiling points between 70 and 140° C. at standard pressures, for example benzene, toluene or xylene.

The determination of the value of $n$ within the limits given above can be accomplished simply by varying the molar ratio of the reactants.

Examples of how to prepare such starting materials are presented in a separate section before the claims.

The unsaturated polyesters are produced conventionally by polycondensation, for example, in a melt, wherein the cyclohexane-1,4-dimethanol carbonates, if desired in mixture with other alcohols, are reacted with unsaturated polybasic acids which can be replaced, in part, by saturated polybasic carboxylic acids or the esterifiable derivatives thereof.

In general, the unstaurated polyesters have the following percentage range of molar proportions:

| Monomer | General, percent | Preferred, percent |
|---|---|---|
| Carbonate of cyclohexane-1,4-dimethanol of Formula (A) | 35–70 | 45–60 |
| Unsaturated polybasic acid | 5–50 | 40–50 |
| Saturated polybasic carboxylic acids | 0–45 | 0–10 |

As the unsaturated polybasic acid, it is preferred to employ α,β-unsaturated dicarboxylic acids which have been already suggested as components for polyesters, including but not limited to such preferred species as maleic, fumaric, itaconic, mesaconic or citraconic acid respectively their anhydrides.

The saturated polybasic carboxylic acids are preferably those dicarboxylic acids previously suggested as components for polyesters, including but not limited to such preferred species as phthalic acid, isophthalic acid, terephthalic acid, tetrahydrophthalic acid, hexahydrophthalic acid, endomethylen tetrahydrophthalic acid, halogen containing phthalic acids—like tetrachlorophthalic acid, tetrabromophthalic acid, chlorendic acid—succinic acid, respectively their esterifiable derivatives like anhydrides or esters.

Hardenable molding compositions or coating solutions are obtained by dissolving the thus-obtained polyesters in monomeric $CH_2=C<$ compounds, such as vinyl, allyl, or acrylic compounds, including but not limited to styrene, chlorostyrene, vinyl toluene, divinyl benzene, diallyl phthalate, methacrylic acid esters, cyanuric acid triallyl esters, etc. Such polyester solutions are distinguished by good compatibility with known polyester resins and can be mixed and processed therewith. The mol ratio of the $CH_2=C<$ compound to the unsaturated acid is generally about 1:1 to 7:1, preferably 2:1 to 4:1, respectively.

Suitably, small amounts of a stabilizer, such as hydroquinone, p-tert.-butyl-catechol, or 2,5-di-tert.-butyl-benzoquinone, are added to the liquid resins.

Depending upon the purpose for which they are employed, the molding and coating compositions are mixed with various fillers and/or pigments in accordance with conventional techniques.

These compositions are hardened at room or elevated temperatures, after the addition of curing catalysts, for example, organic peroxides, such as cyclohexanone peroxide, cumene hydroperoxide, methylethylketone peroxide, or benzoyl peroxide. Accelerators, such as soluble metal salts, particularly cobalt salts, or tertiary amines can also be beneficially employed.

The molded shapes and coatings produced in accordance with this invention exhibit a surprisingly high heat distortion stability at elevated temperatures, in conjunction with a high impact strength and good elasticity. The copolymerizates, in view of their excellent impact strength and heat distortion stability at higher temperatures, are particularly suitable for the production of molded parts, such as aircraft components, subject to high thermal and mechanical stresses. In addition, the polyester compositions of this invention are particularly suitable as vehicles for lacquers. They can be employed as clear lacquers or also pigmented—even with basic pigments—and, if desired, admixed to non-polymerizing solvents, such as ethyle acetate. With the aid of the above-mentioned curing catalysts, coatings produced from the polyester compositions of this invention harden at room temperature (even as thin layers) into hard, non-tacky films of excellent luster, and adhere well to glass, wood, and metals. If desired, it is also possible to cure the correspondingly catalyzed molded polyester compositions with heat, thereby making them usable for baked-on enamels.

The resultant coatings, for example, prime coats, undercoats, or top coatings, are distinguished by their excellent impact resistance and elasticity over lacquers produced on the basis of previously suggested polyester resins. Of equal importance is that aged coatings from the esters of this invention do not become brittle, and thus do not tend to form cracks.

The beneficial mechanical and thermal properties are coupled with an excellent resistance to alkalis. Quite surprisingly, the carbonate bond in the hardened molded polyester masses is not attacked by saponifying agents, not event by sodium or potassium hydroxide under heat. The surface characteristics, as well as the mechanical properties of the test samples remain practically unchanged after boiling for several days in a sodium hydroxide solution.

With respect to the structure of the unsaturated polyesters of this invention, it conforms to the approximate formula:

wherein U represents a mol of acid, that means the whole portion of saturated and unsaturated acids. B represents a mol of the dihydric carbonate of Formula A, and wherein there are about 1 to 2 mols of U and 2 to 1 mols of B, preferably 1 mol U and 0.90–1.2 mols B in the linear ester, which has generally a molecular weight of 500–700, preferably of 1000–3000.

After curing with a $CH_2=C<$ compound, the structure is cross-linked in the three dimensions.

The physical properties of the cured products of this invention are as follows:

Flexural strength (kg./cm.$^2$) _____ 600–2000
Impact strength (cm. kg./cm.$^2$) _____ 10–30
Indentation hardness (kg./cm.$^2$) 10
  seconds _____ 1400–1600
Heat distortion temperature according to
  Martens (° C.) _____ 80–100

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

In such examples, all parts and percentages are on a weight basis, unless otherwise indicated.

EXAMPLE 1

From cyclohexane-1,4-dimethanol (50% in the trans form), there is produced a cyclohexane-1,4-dimethanol carbonate of the following formula:

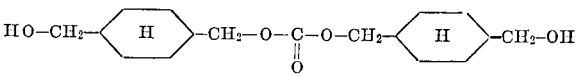

Nine hundred and sixty parts of the above carbonate and 348 parts of fumaric acid are esterified in the presence of 0.24 part hydroquinone, at 180° C., for 6 hours in a nitrogen-purged flask provided with a water finger and a stirrer. The reaction is such that an acid number of 11 is reached. After the reaction mixture has been allowed to cool to 140° C., 0.24 part of hydroquinone is added, and the polyester is dissolved in 800 parts of styrene.

200 parts of the water-clear polyester-styrene solution (styrene content 40%) are stirred together with 1.2 parts of a 10% cobalt naphthenate solution in toluene, as well as 4 parts of a 40% methylethylketone-peroxide solution in dimethyl phthalate. After 33 minutes at 20° C. in a mold, the mass becomes set, thereby producing a hard, glass-clear cast body having excellent heat distortion temperature dimensional stability, as well as good impact resistance. It is also worthy to note that the surface of the cast body exposed to air is just as hard and tack-free as the surfaces contacted by the mold. After a final cure at 80° C. for 8 hours, the following mechanical properties are obtained:

Flexural strength (kg./cm.$^2$) _____ 680
Impact strength (cm. kg./cm.$^2$) _____ 10.7
Indentation hardness (kg./cm.$^2$) 10 seconds _____ 1460
Heat distortion temperature, according to
  Martens (° C.) _____ 100

After the same test specimens are boiled for 45 hours in a 10% solution of sodium hydroxide, a second measurement of the mechanical properties indicates no significant changes as compared to the unboiled specimens.

EXAMPLE 2

From cyclohexane-dimethanol-1,4 (50% trans), there are produced 988 parts of the following cyclohexane-1,4-dimethanol carbonate:

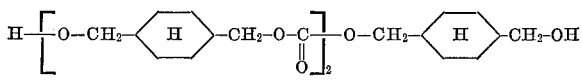

This carbonate and 232 parts of fumaric acid are esterified in the presence of 0.23 part hydroquinone, in the same manner as in Example 1, for 7½ hours, until an acid number of 10 is attained. After cooling to 140° C., the unsaturated polyester, after adding 0.23 part hydroquinone, is diluted with 765 parts styrene.

200 parts of the transparent water-clear polyester-styrene solution are stirred at room temperature with 1.2 parts of a 10% cobalt naphthenate solution and 4 parts of a 40% methylethylketone-peroxide solution. In a mold, the polyester mass is hardened after about 31 minutes and results in hard, water-clear, transparent cast bodies having the following properties after a final cure at 80° C. for 8 hours:

Flexural strength (kg./cm.$^2$) _____ 1095
Impact strength (cm. kg./cm.$^2$) _____ 16.7
Indentation hardness (kg./cm.$^2$) 10 seconds _____ 1459
Heat distortion temperature according to Martens
  (° C.) _____ 92

Boiling the same specimens for 45 hours in a 10% solution of sodium hydroxide did not change the above values significantly.

EXAMPLE 3

From cyclohexane-1,4-dimethanol having a transcontent of 75%, there are produced 900 parts of the following cyclohexane-1,4-dimethanol carbonate:

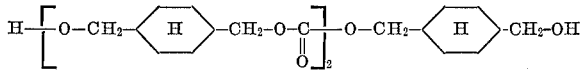

This carbonate and 276 parts maleic acid anhydride are esterified, after the addition of 0.113 part hydroquinone, in the same manner as in Example 1, for 8½ hours until an acid number of 7 is obtained. After cooling to 140° C. and the addition of 0.113 part hydroquinone, the unsaturated polyester is diluted with 884 parts styrene. As in Example 1, the solution is hardened at room temperature to form hard, water-clear cast bodies having the following properties after a final cure at 80° C. for 8 hours:

Flexural strength (kg./cm.$^2$) _____ 1032
Impact strength (cm. kg./cm.$^2$) _____ 20.7
Indentation hardness (kg./cm.$^2$) 10 seconds _____ 1464
Heat distortion temperature according to Martens
  (° C.) _____ 90

The test specimens are not significantly affected by 45 hours of boiling in 10% solution of sodium hydroxide.

EXAMPLE 4

From cyclohexane-1,4-dimethanol having a trans-content of 50%, there are produced 1136 parts of the following cyclohexane-1,4 dimethanol carbonate:

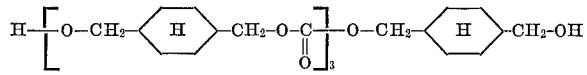

This carbonate and 166 parts maleic acid anhydride are esterified, after the addition of 0.127 part hydroquinone, in the same manner as in Example 1, for 8½ hours at 190° C., until an acid number of 9 is reached. The polyester, after the further addition of 0.127 part hydroquinone, is dissolved in 100 parts styrene. The water-clear polyester-styrene solution is hardened at room temperature in the same manner as set forth in Example 1. The thus-obtained transparent, hard cast bodies have the following mechanical properties, after 8 hours of post-hardening (the final cure) at 80° C.:

Flexural strength (kg./cm.$^2$) _____ 1278
Impact strength (cm. kg./cm.$^2$) _____ 15.9
Indentation hardness (kg./cm.$^2$) 10 seconds _____ 1439
Heat distortion temperature according to Martens
  (° C.) _____ 90

The test samples are not attacked by 45 hours of boiling in 10% solution of sodium hydroxide.

COMPARATIVE EXPERIMENTS

The following comparative experiments demonstrate that the combination of high impact strength, heat distortion stability at high temperatures, and alkali resistance obtained according to Example 1 to 4 cannot be achieved with molded and cured polyester masses based on unsaturated polyesters containing either conventional components in varied amounts, or special components according to the state of the art:

COMPARATIVE EXAMPLE I

In the same manner as in Example I, 116 parts (1 mol) fumaric acid, 148 parts (1 mol) phthalic acid anhydride, 62 parts (1 mol) glycol, and 106 parts (1 mol) diethylene glycol are esterified in the presence of 0.076 part hydroquinone until an acid number of 26 is obtained. The resultant resin is diluted, after adding 0.076 part hydroquinone, in 186 parts styrene to form a 67% solution.

COMPARATIVE EXAMPLE II

In the same manner as in Example 1, 162 parts (1.4 mols) fumaric acid, 148 parts (1 mol) phthalic acid anhydride, 74 parts (1.2 mols) glycol, and 127 parts (1.2 mols) diglycol are esterified, in the presence of 0.089 part hydroquinone, to an acid number of 26. The polyester is diluted, after the further addition of 0.089 part hydroquinone, with 218 parts styrene to form a 67% resin solution.

HARDENING OF THE COMPARATIVE SAMPLES 200 parts each of the polyester-styrene solutions according to Comparative Examples I and II are hardened by the addition of 1.2 parts of a 10% cobalt naphthenate solution and 4 parts of a 40% methylethylketone-peroxide solution. The test samples exhibit the following mechanical properties after post-hardening (final cure) for 8 hours at 80° C.:

| Mechanical properties | Comparative Experiment I | Comparative Experiment II |
|---|---|---|
| Flexural strength (kg./cm.$^2$) | 1,250 | 1,100 |
| Impact strength (cm.kg./cm.$^2$) | 12 | 7 |
| Indentation hardness (kg./cm.$^2$) 10 seconds | 2,000 | 1,950 |
| Heat distortion temperature according to Martens (° C.) | 60 | 77 |

Although the increase in fumaric acid content in Comparative Example II with respect to Comparative Example I leads to an increase in the cross-linking density of the molded bodies and thus to an improvement in the heat distortion stability at higher temperatures, the impact resistance is simultaneously impaired. Thus, the combination of high Martens number and high impact strength, achieved by the process of the present invention, cannot be attained, to our best knowledge, by varying the proportions of prior art reactants.

COMPARATIVE EXAMPLE III 522 parts fumaric acid, 219 parts adipic acid, and 882 parts cyclohexane-1,4-dimethanol are esterified, after the addition of 0.28 part hydroquinone, in the same manner as in Example 1, for 6 hours at 180° C., until an acid number of 27 is obtained. The resin is diluted, after adding an additional 0.28 part hydroquinone, at 140° C. with 938 parts styrene. Upon cooling to room temperature, the polyester separates from the resin solution as a solid, white crystalline mass. In order to be able to process the polyester-styrene mixture as a homogeneous solution, it is necessary to heat the reaction mixture to about 45° C. 200 parts of the homogeneous solution, heated to 45° C., are hardened by the addition of 1.2 parts of a 10% cobalt naphthenate solution and 4 parts of a 40% methylethyl-ketone-peroxide solution. The test samples, after post-hardening for 8 hours at 80° C., before and after 45 hours of boiling in a 10% solution of sodium hydroxide, exhibit the following properties:

| Mechanical properties | Before alkali boiling test | After alkali boiling test |
| --- | --- | --- |
| Flexural strength (kg./cm.$^2$) | 753 | 240 |
| Impact strength (cm.kg./cm.$^2$) | 5.8 | 1.8 |
| Indentation hardness (kg./cm.$^2$) 10 seconds | 1,450 | 1,420 |
| Heat distortion temperature according to Martens (° C.) | 99 | 101 |

From the above table, it is seen that even with the concomitant use of adipic acid as an elasticizing component, the molded samples of Comparative Example III exhibit a poorer impact resistance and flexural strength than the molded bodies of Examples 1 and 2. In addition, the alkali resistance of the above test samples is greatly inferior to that of the samples of Examples 1 and 2.

EXAMPLE 5

100 parts each of the polyester-styrene solutions produced according to Examples 1 and 2, as well as Comparative Example III, are stirred with 4 parts of a 70% cumene hydroperoxide solution and 2 parts of a 20% cobalt octoate solution. Films having a thickness of 50$\mu$ are applied to steel plates. After drying for 24 hours, the resultant clear coatings of a thickness of 50$\mu$ are examined for pencil hardness and elasticity by measuring the Erichsen depression (Olsen test):

| Clear coating according to: | Pencil hardness | Olsen depression (mm.) |
| --- | --- | --- |
| Example 1 | 3H | 8.7 |
| Example 2 | 3H | 10.0 |
| Comparative Example III | 3H | 3.6 |

The preceding comparative data demonstrate the far better elasticity of the coatings produced according to Examples 1 and 2, as compared to those of Comparative Example III.

PREPARATION OF STARTING MATERIALS

EXAMPLE 1

The following example describes the preparation of an oligomeric carbonate with one carbonate group ($n=1$).

Into a mixture of 1154 parts by weight (8 mols) of 1,4-bis(hydroxymethyl)-cyclohexane (50% trans-content) and 400 parts by weight of toluene there was introduced under vigorous stirring and at approximately 47° C., 396 parts by weight (4 mols) of phosgene over a period of 4 to 5 hours. The reaction mixture was then stirred for 14 hours at approximately 20° C. and thereupon heated gradually over a period of 5 hours to 120° C. under introduction of nitrogen, with the hydrogen chloride escaping and finally the toluene was removed by distillation. The contents of the container was then freed of any residue of the solvent by heating for a period of 3 hours at 120° C. and at a pressure of 10 to 12 torr. There remained 1260 parts by weight of a colorless, transparent and viscous carbonate with a hydroxyl number of 369.

EXAMPLE 2

The following example describes the preparation of an oligomeric carbonate with an average of two carbonate groups ($n=2$).

Into a mixture of 865 parts of weight (6 mols of 1,4-bis-(hydroxymethyl)-cyclohexane (50% trans-content) and 300 parts by weight of toluene there was introduced under vigorous stirring at a temperature ranging from 45 to 50° C., 245 parts by weight (2.5 mols) of phosgene, followed by 151 parts by weight (1.5 mols) of phosgene at 10 to 15° C. The reaction product was then stirred at room temperature for approximately 15 hours, and thereupon heated gradually over a period of 5 hours to 120° C. with nitrogen being passed through, thereby removing any remaining hydrogen chloride and finally the toluene was removed by distillation. The contents of the container was subsequently treated for another 3 hours at 120° C. and at 5 to 20 torr. The yield was 960 parts by weight of a transparent, colorless oligomeric carbonate with a hydroxyl number of 239.

EXAMPLE 3

The following example describes the preparation of an oligomeric carbonate with an average of three carbonate groups ($n=3$).

Into a mixture of 1152 parts by weight (8 mols) of 1,4-bis(hydroxymethyl)-cyclohexane (50% trans-content) and 400 parts by weight of toluene there was introduced under vigorous stirring at 45° C. over a period of 3 hours 365 parts by weight (3.7 mols) of phosgene. The contents of the container was then cooled to about 10° C. and 230 parts by weight (2.3 mols), of the gaseous phosgene was then introduced at this temperature over a period of 3 hours. The reaction mixture was stirred for approximately 14 hours at 20° C. during which period the bulk of the hydrogen chloride was expelled. The mixture was thereupon heated within 4 hours up to 120° C., with nitrogen being introduced and the toluene removed by distillation. The contents of the container was freed of solvent over a period of 3 hours at 120° C. and 12 torr. There remained 1285 parts by weight of a colorless, transparent, oligomeric carbonate with a hydroxyl number of 176.

EXAMPLE 4

The following example described the preparation of an oligomeric carbonate with an average of five carbonate groups ($n=5$).

Into a mixture of 865 parts by weight of bis-(1,4-hydroxymethyl)-cyclohexane (6 mols) and 350 parts by weight of toluene there was introduced under vigorous stirring at 45 to 50° C., 375 parts by weight (3.8 mols) of phosgene and then another 120 parts by weight (1.2 mols) of phosgene at 10 to 15° C. The reaction product was then further processed as described above in Example 3. There remained 980 parts by weight of colorless and transparent, oligomeric carbonate with a hydroxyl number of 115.

EXAMPLE 5

The following example describes the preparation of an oligomeric carbonate with an average of three carbonate groups ($n=3$).

594 parts by weight (6 mols) of liquid phosgene was dissolved in 700 parts by weight of toluene; this solution was added drop-by drop over a period of 1 hour under stirring to 1152 parts by weight (8 mols) of 1,4-bis-(hydroxymethyl)-cyclohexane (75% trans-content) which had been heated to 45 to 50° C. Upon completion of the addition the reaction mixture was stirred for 1 hour at approximately 50° C. and then heated to 120° C. while being stirred and subjected to a flow-through of nitrogen. The bulk of the hydrogen chloride generated escaped and the solvent removed by distillation. The contents of the container was freed of solvent residue by heating to 120° C. and application of a vacuum of <10 torr over a period of 2 hours. There remained 1280 parts by weight of a colorless, transparent and viscous carbonate with a hydroxyl number of 167.

EXAMPLE 6

The following example describes the preparation of an oligomeric carbonate with an average of five carbonate groups ($n=5$).

495 parts by weight (5 mols) of liquid phosgene was dissolved in 600 parts by weight of toluene. This solution was added drop-by-drop oved a period of 1 hour under stirring to 864 parts by weight (6 mols) of 1,4-bis-(hydroxymethyl) - cyclohexane (75% trans-content) which had been heated to 45 to 50° C. Upon completion of the addition the reaction mixture was stirred for 1 hour at approximately 50° C. and then heated to 120° C. in a flow of nitrogen. The bulk of the hydrogen chloride escaped and the solvent was removed by distillation. The contents of the container was freed of solvent residue by heating to 120° C. and application of a vacuum of <10 torr over a period of 2 hours. There remain 990 parts of a colorless and highly viscous oligomeric carbonate.

EXAMPLE 7

The following example describes the preparation of an oligomeric carbonate with an average of nine carbonate groups ($n=9$).

446 parts by weight (4.5 mols) of liquid phosgene was dissolved in 550 parts by weight of toluene. This solution was added drop-by-drop over a period of 1 hour under stirring to 721 parts by weight (5 mols) of 1,4-bis-(hydroxymethyl) - cyclohexane (75% trans - content) which had been heated to 45 to 50° C. Upon completion of the addition the reaction mixture was stirred for 1 hour at approximately 50° C. and then heated to 120° C. with a flow of nitrogen. The bulk of the hydrogen chloride escaped and the solvent was removed by distillation. The contents of the container was freed of solvent residue by heating to 120° C. and application of a vacuum of <10 torr over a period of 2 hours. There remained 820 parts by weight of a colorless, thermoplastic, transparent, oligomeric carbonate.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An unsaturated polyester of an $\alpha,\beta$-ethylenically unsaturated dicarboxylic acid and a carbonate of cyclohexane-1,4-dimethanol of the formula:

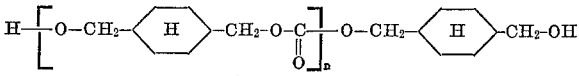

wherein $n$ represents an integer of 1 to 9, inclusive.

2. A polyester as defined by claim 1 wherein $n$ represents an integer of 1 to 4, inclusive.

3. A polyester as defined by claim 1 wherein said acid is maleic, fumaric, or itaconic acid.

4. A cross-linked polymer of a polyester as defined by claim 1, cross-linked by an agent of the formula $CH_2\!=\!C\!<$ wherein the unfulfilled valences are satisfied by moieties which do not enter into the reaction, said polymer having high impact strengths, excellent alkali resistance, and good heat distortion stability at high temperatures.

5. A cross-linked polymer of a polyester as defined by claim 3, cross-linked by an agent of the formula $CH_2\!=\!C\!<$ wherein the unfulfilled valences are satisfied by moieties which do not enter into the reaction, said polymer having high impact strengths, excellent alkali resistance, and good heat distortion stability at high temperatures.

6. A polymer as defined by claim 4 wherein said agent is styrene.

7. A polymer as defined by claim 5 wherein said agent is styrene.

References Cited

UNITED STATES PATENTS 3,124,554   3/1964   Schnell et al. _____ 260—45.5
3,251,805   5/1966   Schnell et al. _____ 260—47

WILLIAM H. SHORT, Primary Examiner

E. A. NIELSEN, Assistant Examiner

U.S. Cl. X.R.

117—124, 127, 148, 161; 260—75, 46.3, 863, 864

UNITED STATES PATENT OFFICE
CERTIFICATE OF CORRECTION

Patent No. 3,551,520　　　　　　　Dated December 29, 1970

Inventor(s) RUDOLF NEHRING? KLAUS HEIDEL and KARL HAMANN

It is certified that error appears in the above-identified patent and that said Letters Patent are hereby corrected as shown below:

Column 2, Line 5, change "lacquer on the film surface" to ---lacquer film on the surface---

Column 5, Line 73, change "190° C.," to ---180° C.,---

Column 5, Line 75, change "100" to ---1000---

Signed and sealed this 13th day of April 1971.

(SEAL)
Attest:

EDWARD M. FLETCHER, JR.　　　　　　WILLIAM E. SCHUYLER, JR.
Attesting Officer　　　　　　　　　　Commissioner of Patents